United States Patent
Byron et al.

(10) Patent No.: US 9,870,550 B2
(45) Date of Patent: Jan. 16, 2018

(54) MODIFYING EXISTING RECIPES TO INCORPORATE ADDITIONAL OR REPLACE EXISTING INGREDIENTS

(71) Applicant: International Business Machines Corporation, Armonk, NY (US)

(72) Inventors: Donna K. Byron, Petersham, MA (US); Carmine M. DiMascio, West Roxbury, MA (US); Florian Pinel, New York, NY (US); Timothy P. Winkler, Clinton, MA (US)

(73) Assignee: International Business Machines Corporation, Armonk, NY (US)

(*) Notice: Subject to any disclaimer, the term of this patent is extended or adjusted under 35 U.S.C. 154(b) by 125 days.

(21) Appl. No.: 14/938,907

(22) Filed: Nov. 12, 2015

(65) Prior Publication Data

US 2017/0139902 A1    May 18, 2017

(51) Int. Cl.
*G06F 17/27* (2006.01)
*G06F 17/21* (2006.01)
(Continued)

(52) U.S. Cl.
CPC ........... *G06Q 10/10* (2013.01); *G06Q 10/087* (2013.01)

(58) Field of Classification Search
CPC .......... G06F 17/27; G06F 17/85; G06F 17/28; G06F 17/277; G06F 17/2735; G06F 17/279; G06F 17/271; G06F 17/274; G06F 17/1775; G06F 17/1755; G06F 17/30654; G06F 17/30734; G06F 17/30684; G06F 17/30401; G06F 17/30445; G06F 17/30598; G06F 17/30705; G06F 17/30663;
(Continued)

(56) References Cited

U.S. PATENT DOCUMENTS 8,718,824 B2    5/2014 Baughman et al.
2008/0243637 A1*  10/2008 Chan ..................... G06Q 30/02
                                                                  705/26.1
(Continued)

OTHER PUBLICATIONS

F. Pinel, "What's Cooking with Chef Watson? An Interview with Lav Varshney and James Briscione," in IEEE Pervasive Computing, vol. 14, No. 4, pp. 58-62, Oct.-Dec. 2015.*
(Continued)

*Primary Examiner* — Edgar Guerra-Erazo
(74) *Attorney, Agent, or Firm* — Stephen J. Walder, Jr.; Diana R. Gerhardt

(57) ABSTRACT

Mechanisms are provided for implementing a recipe modification system. The recipe modification system receives a request to modify an existing recipe from a requestor. The request identifies the existing recipe and an ingredient to be added to the existing recipe. The recipe modification system identifies a cluster of recipe elements associated with the ingredient to be added to the existing recipe and selects a representative member recipe element of the cluster. The recipe modification system modifies the existing recipe based on the selected representative member recipe element and generates a natural language text for the modified recipe based on the existing recipe and the selected representative member recipe element. The recipe modification system outputs the natural language text for the modified recipe to the requestor.

20 Claims, 6 Drawing Sheets

(51) Int. Cl.
*G06Q 10/10* (2012.01)
*G06Q 10/08* (2012.01)

(58) Field of Classification Search
CPC ......... G06F 17/30696; G06F 17/30731; G06F 17/2881; G06F 3/0482; G10L 15/1815; G10L 2015/0631; G10L 2015/228
USPC ...................................................... 704/1–10
See application file for complete search history.

(56) References Cited

U.S. PATENT DOCUMENTS

| | | | |
|---|---|---|---|
| 2008/0243638 A1* | 10/2008 | Chan | G06F 17/30522 705/14.51 |
| 2008/0243815 A1* | 10/2008 | Chan | G06F 17/30867 |
| 2008/0243816 A1* | 10/2008 | Chan | G06F 17/30867 |
| 2008/0243817 A1* | 10/2008 | Chan | G06F 17/30867 |
| 2009/0287678 A1 | 11/2009 | Brown et al. | |
| 2010/0333111 A1* | 12/2010 | Kothamasu | H04L 12/5855 719/313 |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0185119 A1 | 7/2013 | Palao et al. | |
| 2013/0224694 A1* | 8/2013 | Moore | G09B 19/0092 434/127 |
| 2014/0188566 A1 | 7/2014 | Pinel et al. | |
| 2014/0249966 A1* | 9/2014 | Zaragoza | G06Q 30/0635 705/26.81 |
| 2015/0058065 A1 | 2/2015 | Pinel et al. | |
| 2015/0161912 A1* | 6/2015 | Bhattacharjya | A61L 2/16 434/127 |
| 2015/0170543 A1 | 6/2015 | Shahar et al. | |
| 2017/0193853 A1* | 7/2017 | Byron | G09B 19/0092 |

OTHER PUBLICATIONS

Mori, S., Sasada, T., Yamakata, Y., & Yoshino, K. (2012). A machine learning approach to recipe text processing. In Proceedings of the 1st Cooking with Computer Workshop (pp. 29-34).*
"IBM Chef Watson", IBM Corporation, https://www.ibmchefwatson.com/, accessed online Nov. 11, 2015, 1 page.
High, Rob, "The Era of Cognitive Systems: An Inside Look at IBM Watson and How it Works", IBM Corporation, Redbooks, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

MODIFYING EXISTING RECIPES TO INCORPORATE ADDITIONAL OR REPLACE EXISTING INGREDIENTS

BACKGROUND

The present application relates generally to an improved data processing apparatus and method and more specifically to mechanisms for modifying existing recipes to incorporate additional ingredients or replace existing ingredients.

Various computer based systems exist for assisting people with the organization of their cooking recipes for quick retrieval and use. These computing systems are essentially database systems that store data and retrieve the data in response to user requests.

Recently, International Business Machines (IBM) Corporation of Armonk, N.Y., has released an intelligent cooking recipe application referred to as IBM Chef Watson™. IBM Chef Watson™ searches for patterns in existing recipes and combines them with an extensive database of scientific (e.g., molecular underpinnings of flavor compounds) and cooking related information (e.g., what ingredients go into different dishes) with regard to food pairings to generate ideas for unexpected combinations of ingredients. In processing the database, IBM Chef Watson™ learns how specific cuisines favor certain ingredients and what ingredients traditionally go together, such as tomatoes and basil. The application allows a user to identify ingredients that the user wishes to include in the recipe, ingredients that the user wishes to exclude, as well as specify the meal time (breakfast, lunch, dinner), course (appetizer, main, dessert), and the like.

The IBM Chef Watson™ has inspired the creation of a IBM Chef Watson™ food truck, a cookbook entitled *Cognitive Cooking with Chef Watson,* Sourcebooks, Apr. 14, 2015, and various recipes including a barbecue sauce referred to as Bengali Butternut BBQ Sauce.

SUMMARY

In one illustrative embodiment, a method is provided, in a data processing system comprising a processor and a memory comprising instructions which are executed by the processor to cause the processor to implement a recipe modification system. The method comprises receiving, by the recipe modification system, a request to modify an existing recipe from a requestor. The request identifies the existing recipe and an ingredient to be added to the existing recipe. The method further comprises identifying, by the recipe modification system, a cluster of recipe elements associated with the ingredient to be added to the existing recipe and selecting, by the recipe modification system, a representative member recipe element of the cluster. The method also comprises modifying, by the recipe modification system, the existing recipe based on the selected representative member recipe element. Moreover, the method comprises generating, by the recipe modification system, a natural language text for the modified recipe based on the existing recipe and the selected representative member recipe element. In addition, the method comprises outputting, by the recipe modification system, the natural language text for the modified recipe to the requestor.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
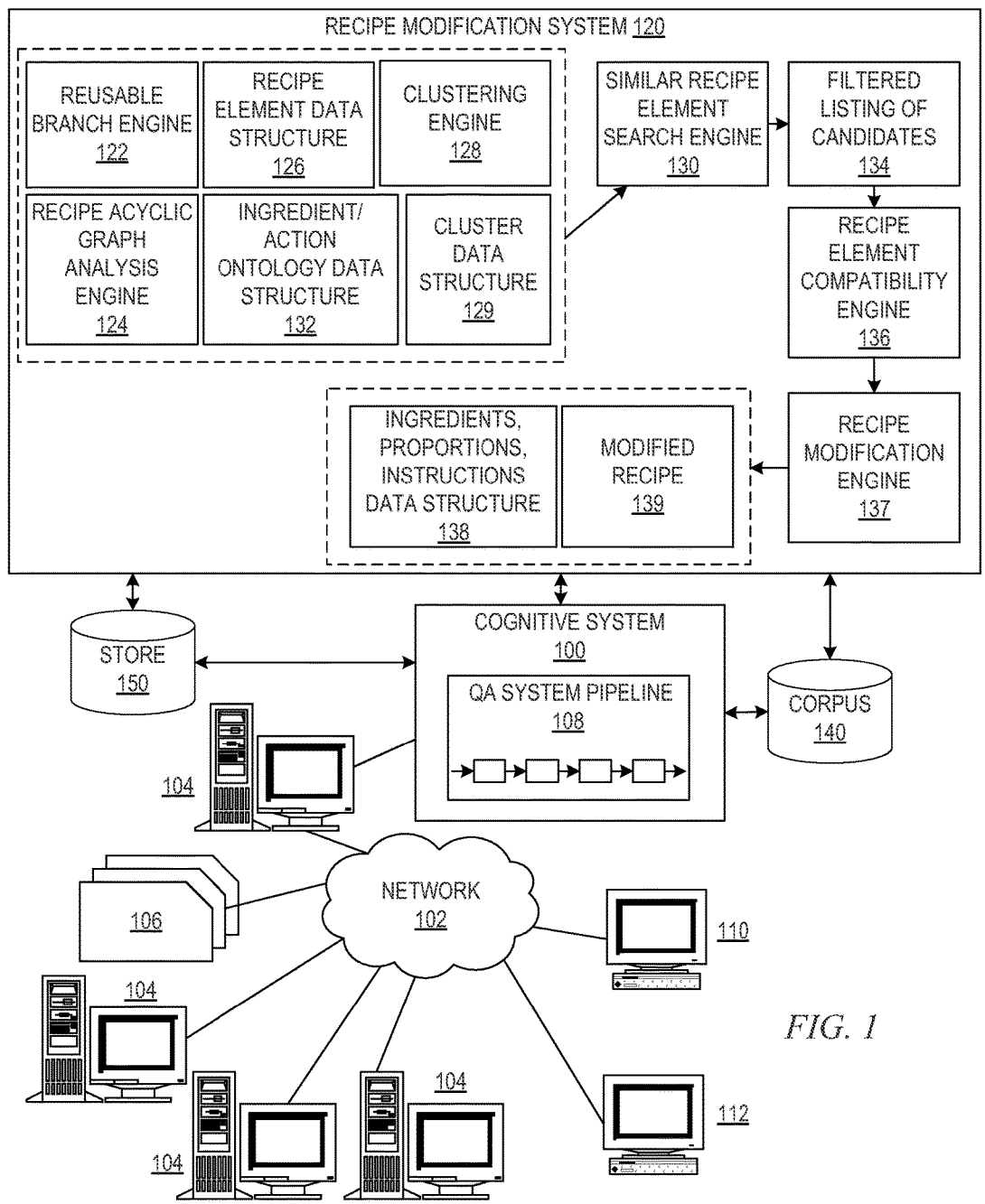
FIG. 1 depicts a schematic diagram of one illustrative embodiment of a question/answer creation (QA) system in a computer network.

The illustrative embodiments provide mechanisms for modifying existing recipes to include additional ingredients or replace existing ingredients with alternative ingredients specified by a user. There are a number of reasons why a person may want to modify an existing recipe by including additional ingredients or replacing ingredients in the recipe including:

(1) to make the recipe healthier (e.g., meals for children with hidden vegetable);
(2) to make the recipe more elaborate (e.g., restaurant dishes often contain more elements than everyday versions of the same dish);
(3) adapt the recipe to personal taste (e.g., some people like to have bacon in most of their dishes or do not like particular types of ingredients, e.g., tomatoes, broccoli, etc.); and
(4) adapt the recipe based on an intended consumers' personal medical situation (e.g., some people are allergic to certain ingredients or foods, e.g., gluten, cinnamon, peanuts, etc.).

However, adding additional ingredients or replacing ingredients in a recipe is not a simple task, i.e. one must take into consideration the complex interplay of ingredients as well as the quantities and preparation of the ingredients both alone and in combination with the other ingredients, including timing in the sequential order of preparation instructions to introduce the ingredient, in order to generate a recipe that is palatable to consumers. Current cooking applications and recipe based computing systems do not provide the complex cognitive capabilities to adequately evaluate such complex interactions of ingredients as well as determine proper quantities and preparation of such ingredients for adding ingredients or replace ingredients in existing recipes.

Current recipe based mechanisms are either fixed databases of recipes that can be searched to identify recipes having certain ingredients, types of foods, meet certain dietary requirements, etc. or use template based recipe mechanisms that have limitations to their functionality for merely substituting ingredients of the same, e.g., substituting one type of vegetable for another type of vegetable. However, in the fixed database mechanisms, these recipes are fixed and are merely selected based on their fixed set of characteristics. In the case of template based recipe mechanisms, the substitution is simply a straight substitution of one ingredient for another ingredient of the same type without any consideration as to the complexity of the different ingredients and their interactions with other ingredients in the recipe. One cannot simply replace 6 ounces of onions with 6 ounces of carrots and achieve a similar result or even a desirable recipe in all cases.

There are no reliable mechanisms that use cognitive computing to determine proper quantities, timing and preparation instructions for introducing new ingredients into existing recipes such that a palatable recipe is generated. This is especially true when the ingredient is significantly different from the other ingredients already present in the existing recipe. For example, it is not necessarily self-evident how to introduce an ingredient such as parsnips, corn, or sauerkraut into a dessert that may be a mousse type, or the like.

The illustrative embodiments provide cognitive mechanisms for modifying an existing recipe to include a new ingredient and/or replacement ingredient, even in the case of the ingredient being vastly different from existing ingredients in the existing recipe. The illustrative embodiments determine how the ingredient can be introduced into the existing recipe, the quantity of the ingredient to introduce, how to prepare the ingredient for introduction into the existing recipe, the timing or location in a sequence of preparation instructions for introduction of the ingredient, and generates a recipe having a set of instructions for preparing the resulting dish. Moreover, the illustrative embodiments further cognitively analyze these aspects of the recipe with regard to possible modifications to other existing ingredients and/or their preparation in the recipe and/or other ingredients not already in the recipe but should be introduced along with the new ingredient to achieve a desired flavor or palatable result.

A data structure defining the various ingredients and actions of recipes in the corpus of existing recipes as well as other known ingredients and actions is analyzed to identify categories or clusters of ingredients and actions based on their characteristics. For example, ingredients and actions are assigned types and ingredients of similar ingredient type are categorized or clustered with one another to form ingredient categories/clusters, as well as actions of similar action types being categorized or clustered into action categories/clusters, thus defining an ingredient ontology and an action ontology. For example, "citrus" may form one ingredient cluster containing lemon, orange, and so on; "cut" may form on action cluster containing chop, slice, dice, etc.

In one illustrative embodiment of the present invention, recipes in a corpus of existing recipes are subjected to natural language processing techniques to transform the recipes into acyclic graphs where nodes represent ingredients and actions, and connectors represent the sequence of actions. In fact, if the sequence of recipe instructions is recorded backwards, or the acyclic graph is inverted, the acyclic graph is a tree structure where the root node is actually the final step in the recipe, e.g., the "serve" action.

These acyclic graphs are then analyzed to identify reusable branches where a reusable branch is a branch of nodes and connectors that stems from a root node (of the inverted acyclic graph) or top node (of the non-inverted graph, or the leaf nodes of the inverted graph), represents a sub-process of the recipe, involves only a limited number of ingredients less than the total number of ingredients in the recipe, and whose individual nodes are not otherwise referenced again in the recipe, i.e. in other nodes of the acyclic graph (only the result of the reusable branch is later utilized in the recipe). Examples of reusable branches in recipes may be, for example, chopped herbs added on top of a dish, sautéed vegetables served on the side of the dish, sauce added to finish a dish, ice cream served on a plated dessert, or the like.

The reusable branches of the acyclic graph are then clustered. In some cases, this clustering, or categorization, can be achieved by parsing the text of a recipe which may include subsection headers that specifically identify the category or type of the ingredient/action, e.g., "for the peach sauce" indicates that the subsequent actions and ingredients are associated with a sauce. Thus, in some illustrative embodiments, the mechanisms of the illustrative embodiments may perform natural language processing on the existing recipes in the recipe corpus to identify the various clues in the text of the recipe to indicate characteristics of the graph branches for purposes of clustering/classifying graph branches. In other embodiments, the reusable branches can be clustered using a machine learning algorithm.

It should be appreciated that some clusters may have sub-clusters and various levels of clustering/categorization may be performed, e.g., a salad cluster may include various vegetables, herbs, dressing, etc., which may be classified/clustered into other clusters, such as chopped herbs for example. Similarly, the salad itself may be classified/clustered into various classifications/clusters including an appetizer cluster, a side dish cluster, or the like. Thus, the same reusable branch may be present in multiple clusters/categories.

Thus, as noted above, as a pre-processing operation, the corpus of existing recipes is analyzed to identify reusable branches and to identify categories/clusters of branches. Thereafter, when a user wishes to modify an existing recipe with the addition of a new ingredient and/or replacement of an ingredient in the recipe with a new ingredient, a listing of the branch clusters/categories that involve the given new ingredient is identified by searching the branch clusters/categories. In making this list, the mechanisms of the illustrative embodiments may analyze the recipe elements (ingredients and actions) of the reusable branches that contain the new ingredient to produce an initial list of candidate recipe elements, i.e. reusable branches comprising ingredients and actions. This listing may then be extended with candidate recipe elements for similar ingredients/actions obtained from the ingredient/action (referred to herein collectively as "recipe elements") clusters/categories.

Alternatively, the clustering may be performed after the identification of similar ingredients/actions to those of the reusable branches found as having the new ingredient. For example, given a new ingredient to be included, the reusable branches of the existing recipes that involve the new ingredient are identified and a list of candidate recipe elements is generated. The list is then extended with candidate recipe elements for similar ingredients by using a provided ingredient ontology data structure. For example, if the new ingredient is "chives", the ontology may be used to look for recipe elements that use any fresh herb (an ingredient type of the ingredient "chives") instead of chives. Those candidate elements may be included in the listing and the listing may be analyzed to perform categorization or clustering of the recipe elements.

Whether the clustering is done as a pre-processing operation and clusters are selected at runtime, or the clustering is performed after identification of similar ingredients/actions (recipe elements) via an ingredient/action ontology, the illustrative embodiments then determine whether the original existing recipe that is to be modified already contains any of the clusters of candidate recipe elements. For those clusters that are already present within the existing recipe, the candidate clusters may be eliminated from the listing. The concept is that adding additional recipe elements of a same type to an existing recipe rarely improves the palatability of the recipe, e.g., adding an additional mix of chopped herbs (2 herb mixes), an additional pie crust (2 pie crusts), or an additional sauce (2 sauces) will unlikely result in an improved recipe. The result is a filtered listing of candidate recipe elements and their clusters.

The recipe element clusters remaining in the filtered listing of candidate recipe elements are then analyzed to identify which of the element clusters are compatible with the dish type of the original existing recipe that is to be modified. This analysis may involve application of rules learned during a training of the mechanisms of the illustrative embodiment, where the rules specify compatibility of recipe elements with different dish types. That is, recipes in the recipe corpus are classified into dish types, e.g., appetizer, side dish, main dish, dessert, etc. Using association rules learned during training, the illustrative embodiments determine what combinations of one or more recipe elements are found in recipes of the same dish type as the original existing recipe, e.g., in a quiche recipe, the combinations may be egg mixture and pie crust, egg mixture and pie crust and chopped herb, egg mixture and pie crust and mixed greens, etc. The intersection of the association rules with the candidate recipe element clusters indicates which element clusters are compatible with the dish type of the original existing recipe that is being modified.

The resulting candidate clusters that intersect with the association rules may then be ranked, such as based on frequency of appearance of the clusters, or recipe elements in the cluster, in the recipe corpus or in recipes of the recipe corpus that have a similar dish type as the dish type of the original existing recipe. Thus, for example, if a cluster comprises 5 recipe elements, the frequency of occurrence of those 5 recipe elements may be evaluated, combined, and compared to the frequency of occurrence of recipe elements of other clusters to determine a relative ranking of the clusters. Rankings of clusters may be performed using alternative criteria for ranking as well, such as ease of preparation, number of ingredients, cost, learned user preferences, color, ingredient availability, and the like.

A recipe element cluster in the filtered listing of candidate clusters, which also intersects with one or more of the association rules, is selected for use in modifying the original existing recipe. This selection may be based on the ranking of the clusters intersecting the association rules as discussed above. For example, a top ranked cluster may be selected for further use in modifying the original existing recipe. Alternatively, other selection criteria may be utilized as well, such as in an implementation where ranking of the clusters may not be performed. For example, similar criteria as used for ranking of clusters may be used for selection of clusters as well.

From the selected cluster, a representative element from the cluster to represent the element that will be added to the existing recipe that is to be modified, either by adding in the additional element or replacing an existing element of the recipe with the new selected element from the selected cluster. Various techniques, or combinations of techniques, may be employed to select the representative element from the selected cluster. For example, if one element of the selected cluster comprises the specific ingredient and/or action that the user indicated they wanted to add to the existing recipe, then that element may be selected as the representative element from the selected cluster.

As another technique, a similarity metric may be utilized to evaluate the similarities of the elements in the selected cluster to the ingredient that the user specified the user wanted to add to the existing recipe and then select an element that is most similar to the ingredient that the user wanted to add to the existing recipe. For example, consider that an ingredient hierarchy is established in which "cumin" and "wild cumin" would be very similar, e.g., one would be the parent node in the hierarchy of the other, and these would be similar to coriander (both are seeds used as spices), but less similar to tarragon (even though they may all still belong to a seasoning cluster or category). Cumin and turkey, however, would be dissimilar in the hierarchy and thus, the distance, e.g., number of nodes, or links in the hierarchy, may be used as a distance metric for determining similarity of recipe elements. These are only examples and it should be appreciated that other selection criteria for selecting the representative element may be utilized as well, such as selecting a representative element that has a smallest number of ingredients and/or actions.

Of course, any combination of these selection criteria may be used as well. For example, a hierarchical selection criteria may be utilized in which a first check is made to determine if the exact same ingredient as requested by the user to be added to the existing recipe is present and if not, then a second check is made as to which element in the cluster is the most similar to the ingredient requested to be added by the user. This selection of a most similar element may include identifying any element in the selected cluster whose similarity metric meets or exceeds a similarity threshold specifying a minimum level of similarity. Then, if there are multiple similar elements having similarity metrics meeting or exceeding this minimum level of similarity, then the number of ingredients and/or actions may be evaluated to select one element from the multiple similar elements as the representative element, e.g., the element having the least number of ingredients and/or actions.

The selected representative element of the cluster is then used to generate an ingredient list, proportions, and instructions needed to prepare the selected recipe element represented by the selected cluster. It should be appreciated that the selected representative element was generated from existing recipes, e.g., through the identification of reusable branches as noted above, and thus, will include the amounts of ingredients and the preparation instructions. The representative element may be used as is to add to the existing recipe and/or replace an existing element in the recipe, or its ingredients can be substituted to pair better with the original recipe using pairing algorithms. For example, the representative element may contain both the user specified ingredient that the user wished to add to the recipe and one or more other ingredients. The other ingredients may be analyzed to determine if other similar ingredients will pair better with the existing ingredients in the recipe based on established knowledge.

The ingredients list, proportions, and preparation instructions corresponding to the selected representative element are merged into the original existing recipe as a new recipe section or branch. For example, a sub-tree or branch is added to the acyclic graph of the original existing recipe to generate a modified or new recipe. The placement of this new sub-tree or branch is selected in accordance with rules for associating the type of selected representative element with other elements of the original existing recipe. For example, if the selected representative element is a sauce, the rules may specify that sauces are associated with either the root node of the acyclic graph, which is typically the "serve" action as previously discussed above, or another node representing a heating or cooking action. This is effectively representing the fact that sauces are either added after the completion of the other recipe steps, e.g., the sauce is poured on top of the other ingredients or the other ingredients are added to the sauce, and that this may be done prior to heating or cooking the combination of ingredients. The acyclic graph may be analyzed to identify portions of the acyclic graph that meet the criteria of the rule and selection criteria may be used to select the most appropriate place to add the representative element, e.g., the node closest to the top of the graph, the node closest to the root node, etc.

The modified acyclic graph with the additional branch or sub-tree corresponding to the selected representative element from the selected cluster is then converted to a natural language text recipe output. That is, just as the natural language text was used as a basis for generating the acyclic graph of the original existing recipe, a reverse operation is performed to generate a natural language text recipe based on the modified acyclic graph including the new sub-tree or branch, properly located within the sequential listing of the recipe steps. Similarly, the listing of ingredients for the recipe is updated to include the additional ingredients present in the new sub-tree or branch as well.

It should be appreciated that while the above description primarily assumes the addition of a new ingredient to an existing recipe, as noted above, the illustrative embodiments may also be used to replace existing elements in the existing recipe with replacement elements. For example, assume that there is an existing recipe for a chocolate cake served with strawberry ice cream. Instead of choosing an ingredient the user wishes to add to this existing recipe, which results in a new recipe element being added to the existing recipe elements, the user may choose an ingredient that is already used in the recipe in a specific recipe element, e.g., the strawberry ice cream in this example, and decide that they want to keep the strawberries but use them in a different recipe element. This operation would utilize the same workflow, mechanisms, and operations discussed above, but with a preliminary operation where the recipe element having the selected recipe ingredient/action to be replaced, e.g., the strawberry ice cream element, is removed from the existing recipe's acyclic graph. The workflow would then determine a number of possible new recipe elements (sauce, preserves, fruit salad) and select one for modifying the chocolate cake with strawberry ice cream recipe and thereby generate a new or modified recipe.

Thus, the mechanisms of the illustrative embodiments provide an intelligent cognitive system for modifying existing recipes to include new or replacement ingredients into the existing recipes to generate modified new recipes taking into consideration similarities of ingredients, appropriateness of ingredients, ingredient associations, and preparation rules/instructions associated with such ingredients.

Having given an overview of operations in accordance with one illustrative embodiment, before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
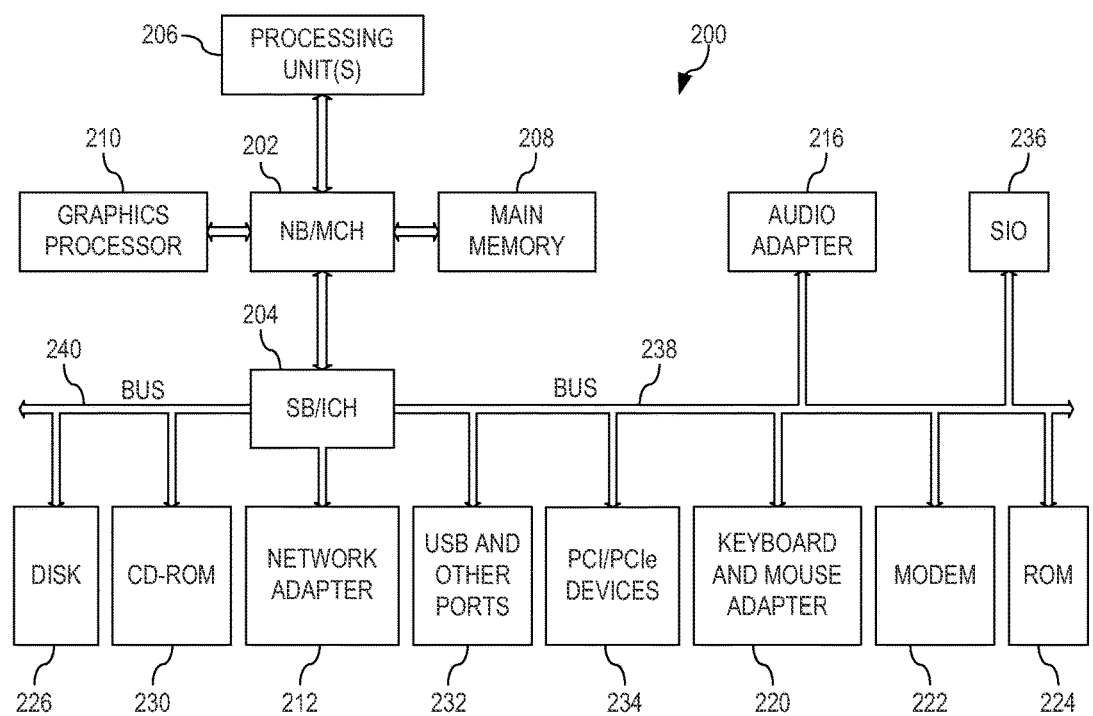
FIG. 2 is a block diagram of an example data processing system in which aspects of the illustrative embodiments are implemented.
Figure 3:
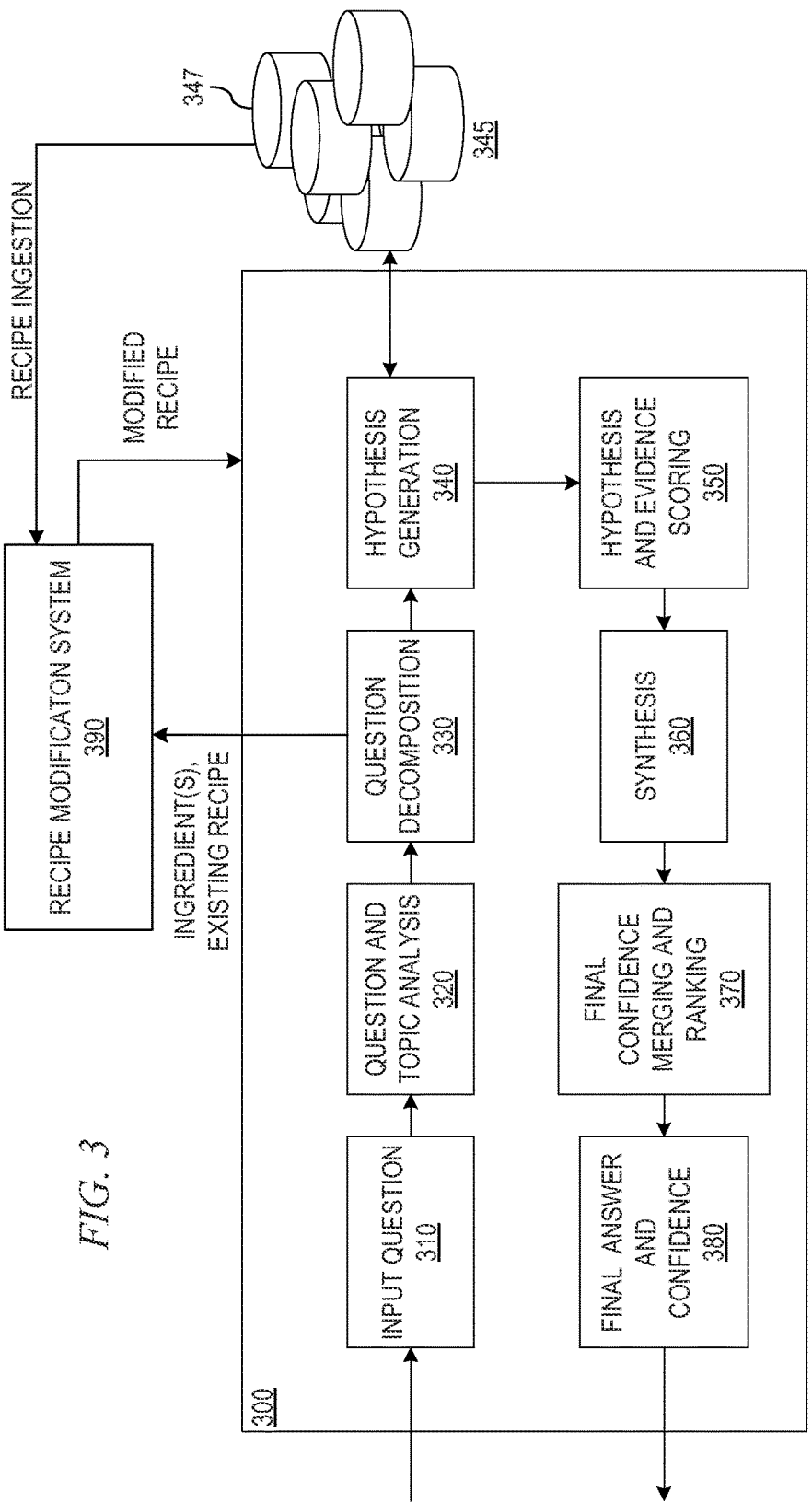
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention. In fact, while a QA system architecture will be described with regard to FIGS. 1-3, the illustrative embodiments do not require the presence of a QA system in order to operate. This is only one example implementation and other implementations and illustrative embodiments may utilize other types of data processing systems without departing from the spirit or scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to existing recipe modifications by introducing new or replacement ingredients into the existing recipe. For example, the QA pipeline may receive as an input question a request to add a new ingredient to an existing recipe, e.g., "How do I add tarragon to quiche recipe #2?" Thus, the request, which may or may not be presented in the form of a natural language question, specifies the new ingredient to be integrated into the recipe and the identity of the original existing recipe that is the subject of the modification.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a recipe modification system 120. The operation of the recipe modification system 120 may be initiated in response to receiving a request or input question directed to modifying an existing recipe to include one or more additional or replacement ingredients and/or actions (recipe elements). The request or input question may be provided via a graphical user interface through which a user selects an existing recipe to modify and one or more recipe elements (ingredients and/or actions) to add to the identified existing recipe, and/or one or more recipe elements in the existing recipe to be replaced, such as previously described above.

In response to the request or input question, the recipe modification system 120 determines how the recipe element can be introduced into the identified existing recipe, the quantity of the ingredient(s) of the recipe element to introduce, how to prepare the ingredient(s) for introduction into the existing recipe, the timing or location in a sequence of preparation instructions for introduction of the recipe element, and generates a recipe having a set of instructions for preparing the resulting dish. Moreover, the recipe modification system 120 further cognitively analyzes these aspects of the recipe with regard to possible modifications to other existing recipe elements, e.g., ingredients and/or their preparation, in the recipe and/or other recipe elements not already in the recipe but should be introduced along with the new recipe element to achieve a desired flavor or palatable result.

In one illustrative embodiment of the present invention, recipes in a corpus 140 of existing recipes are subjected to natural language processing techniques of the cognitive system 100 and/or recipe modification system 120 to transform the recipes into acyclic graphs where nodes represent ingredients and actions (recipe elements), and connectors represent the sequence of actions, as previously mentioned above. This operation may be performed, for example, as part of an ingestion operation of the cognitive system 100 which reads the natural language text of the electronic documents in the corpus 140, parses the natural language text and performs natural language processing on the natural language text, including performing annotation operations using annotators, to extract key features of the natural language text which are then converted to the acyclic graphs of the various recipes in the corpus 140. For example, key features may include ingredients, actions, and terms/phrases representing linkages between ingredients, actions, and combinations of ingredients and actions.

The acyclic graphs of the recipes ingested from the corpus 140 are stored in storage device 150 associated with either the cognitive system 100 or the recipe modification system 120, where the storage device 150 may be a memory, a hard disk based storage device, flash memory, solid state storage device, or the like (hereafter assumed to be a "memory" with in-memory representations of the acyclic graphs for purposes of description). The in-memory acyclic graphs are then analyzed by the reusable branch engine 122 of the recipe modification system 120 to identify reusable branches within the acyclic graphs and a reusable branch data structure having entries for each reusable branch found in this way, and other reusable branches either found in other corpora, readily known and pre-populated in the reusable branch data structure by subject matter experts, or the like, is generated. The identification of the reusable branches may further be associated with the in-memory acyclic graph of the corresponding recipe as well so as to identify for the particular recipe what the reusable branches are in the recipe.

Either as part of the ingestion operation, or by the recipe acyclic graph analysis engine 124 analyzing the acyclic graphs generated by the ingestion operation, a recipe element (ingredient/action) data structure 126 defining the various ingredients and actions of recipes in the ingested recipe corpus 140, as well as other known ingredients and actions pre-populated in the recipe element data structure 126 either through analysis of other corpora or through manual input by subject matter experts, is generated. The ingredients and actions in the recipe element data structure 126 have characteristics determined by the recipe acyclic graph analysis engine 124 in accordance with knowledge bases of ingredients/actions. These characteristics may include information regarding the type of the ingredient/action (recipe elements), e.g., a vegetable, a meat, a fruit, a grain, etc. The characteristics may be provided at any desired granularity such that there may be multiple types within an overall general category of types, e.g., for the category of meat, there may be a type of "lean meat" or "fatty meat". In some cases, rather or in addition to having the knowledge bases of ingredients/actions, the types of ingredients/actions may be determined by the recipe acyclic graph analysis engine 124, or as part of the ingestion operation, when parsing and analyzing the text of a recipe which may include subsection headers or other text that references a specific category or type of the ingredient/action, e.g., the example above of "for the peach sauce" indicates that the subsequent actions and ingredients are associated with a sauce.

The recipe element data structure 126 is analyzed by clustering engine 128 to identify clusters of recipe elements based on their characteristics. For example, recipe elements may be clustered according to similar recipe element type to form recipe element clusters. These clusters may be stored in a cluster data structure 129. For example, sauces may form one cluster, chopped herbs may form another cluster, chop, cut, dice, etc., may all be part of a "cut" cluster, and the like. As noted above, some recipe elements may have sub-elements and various levels of clustering may be performed, e.g., a salad recipe element may include various vegetables, herbs, dressing, etc., which may be classified/clustered into other clusters, such as chopped herbs for example. Similarly, the salad itself may be clustered into various clusters including an appetizer cluster, a side dish cluster, or the like. Thus, the same recipe element may be present in multiple clusters.

When a user wishes to modify an existing recipe with the addition of a new recipe element or replace an existing recipe element with a new recipe element, in response to receiving the request or input question to the cognitive system 100, the request is parsed and analyzed using natural language processing techniques to identify the nature of the request/question, i.e. the nature of the request/question is a modification to an existing recipe. The request/question specifies the recipe to be modified and one or more recipe elements to be added/replaced in the existing recipe.

In response to receiving the input request/question and determining the recipe to be modified and the recipe element(s) that are the subject of the modification, a similar recipe element search engine 130 performs a search of the cluster data structure 129 to generate a listing of the recipe element clusters that involve the given new recipe element(s). In making this list, the cluster search engine 130 may analyze the clusters of reusable branches that contain the new recipe element to produce an initial list of candidate recipe elements. This listing is then extended with candidate recipe elements for similar recipe elements obtained from clusters with which the elements of the reusable branches involving the new recipe element are clustered.

Alternatively, the clustering performed by the clustering engine 128 may be performed after the identification of similar recipe elements to those of the reusable branches found as having the new recipe element(s), performed by the similar recipe element search engine 130 and the list may then be extended with candidate recipe elements for similar recipe elements by using a provided ingredient/action ontology data structure 132. Those candidate elements may be included in the listing and the listing may be analyzed by the clustering engine 128 to generate clusters of recipe elements for storage in the cluster data structure 129.

In either case, the similar recipe element search engine 130 then determines whether the original existing recipe that is to be modified already contains any of the clusters of candidate recipe elements, i.e. the clusters identified as having the new recipe element(s) in the request. For those that are already present within the existing recipe, the candidate clusters may be eliminated from the listing to generate a filtered listing of candidate recipe elements and their clusters 134.

The recipe element clusters remaining in the filtered listing of candidate recipe elements 134 are then analyzed by a recipe element compatibility engine 136 to identify which of the element clusters are compatible with the dish type of the original existing recipe that is to be modified. The recipe element compatibility engine 136 may utilize configured association rules learned during a training of the recipe modification system 120 and knowledge base, where the association rules specify compatibility of recipe elements with different dish types. Using these association rules, the recipe element compatibility engine determines what combinations or patterns of one or more recipe elements are found in recipes of the same dish type as the original existing recipe, e.g., if the original existing recipe is a quiche recipe, then combinations or patterns of recipe elements are identified in other quiche recipes. The intersection of the association rules with the candidate recipe element clusters indicates which element clusters are compatible with the dish type of the original existing recipe that is being modified. The resulting candidate clusters that intersect with the association rules may then be ranked by the recipe element compatibility engine 136, such as based on frequency of appearance of the clusters, or recipe elements in the cluster, in the recipe corpus 140 as a whole, or in recipes of the recipe corpus 140 that have a similar dish type as the dish type of the original existing recipe. Other ranking criteria may also be utilized as noted above.

A recipe element cluster in the filtered listing of candidate clusters 134, which also intersects with one or more of the association rules, is selected by the recipe element compatibility engine 136 for use in modifying the original existing recipe. This selection may be based on the ranking of the clusters intersecting the association rules as discussed above. For example, a top ranked cluster may be selected for further use in modifying the original existing recipe. Alternatively, other selection criteria may be utilized as well, such as in an implementation where ranking of the clusters may not be performed, as previously discussed above.

From the selected cluster, a representative element and/or reusable branch is selected by the recipe modification engine 137 from the cluster to represent the element that will be added to the existing recipe that is to be modified, either by adding in the additional element or replacing an existing element of the recipe with the new selected element from the selected cluster. The reusable branch corresponding to the selected representative element of the cluster is then used by the recipe modification engine 137 to generate an ingredient list, proportions, and instructions needed to prepare the selected recipe element represented by the selected cluster. The ingredients list, proportions, and preparation instructions 138 corresponding to the selected representative element and its reusable branch are merged by the recipe modification engine 137 into the original existing recipe as a new recipe section or branch and a corresponding modified acyclic graph and natural language text corresponding to the modified recipe is generated 139. Similarly, the listing of ingredients for the recipe is updated to include the additional ingredients present in the new sub-tree or branch as well to generate a modified listing of ingredients associated with the modified recipe.

The modified recipe may then be returned to the original requestor or source of the input request/question as a response/answer to the input request/question. The modified recipe may include the natural language text and ingredient listing for the modified recipe provided in a natural language text format, for example. In general, the acyclic graph of the modified recipe is not returned to the requestor or source of the input request/question since it is an internal representation of the recipe for purposes of processing. However, if desired, the acyclic graph data structure for the modified recipe may also be provided back to the requestor/source. The modified recipe may be returned as part of a graphical user interface or other suitable output that provides natural language text and/or graphical representations for representing the modified recipe.

Thus, the mechanisms of the illustrative embodiments provide an intelligent cognitive system for modifying existing recipes to include new or replacement recipe elements (ingredients/actions) into the existing recipes to generate modified new recipes taking into consideration similarities of ingredients, appropriateness of ingredients, ingredient associations, and preparation rules/instructions associated with such ingredients.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206.

The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 may operate in conjunction with a recipe modification system 390, which may be an instance of the recipe modification system 120 described above with regard to FIG. 1. The QA system pipeline 300 may receive an input question 310 that is directed to modification of an existing recipe, e.g., "How can I add kale to my quiche recipe #3?" which specifies the existing recipe (quiche recipe #3) to be modified and one or more ingredients (kale) to be added/replaced (add in this example) in the specified existing recipe. The identification of these features of the input question may be performed through the parsing with topic analysis and question decomposition stages 320 and 330 of the QA system pipeline 300 described previously, for example. For example, in stage 320 it may be determined that the input question 310 has a topic of modifying an existing recipe which triggers the need to utilize the recipe modification engine 390 to facilitate generating the answer to the input question 310. The question decomposition stage 330 may be used to identify the specific recipe to be modified and the ingredients that are the subject of the modification as well as whether the ingredients are being added/replaced.

This information may then be forwarded to the recipe modification engine 390 which operates in the manner described above to generate an answer to the input question 310. In doing so, the recipe modification engine 390, which is assumed to have already ingested a corpus or corpora 345, 347 comprising existing recipes, generates acyclic graphs for the existing recipes in the corpus or corpora 345, 347, identifies reusable branches in the acyclic graphs, identifies reusable branches that reference the ingredient(s) that are the subject of the modification, generates clusters of similar recipe elements, identifies clusters of recipe elements involving the reusable branches that reference the ingredient(s), selects a cluster of recipe elements for use in generating the modification, selects a representative element in the cluster for use in generating the modification, and then determines how/where to add representative element and/or replace existing elements in the existing recipe to thereby integrate the modification, using the selected representative element, to the existing recipe.

The recipe modification engine 390 then returns the modified recipe to the QA system pipeline 300 as the final answer to the input question 310. Since the final answer is provided by the recipe modification engine 390, the other stages of the QA system pipeline 300 may be bypassed and the final answer may be output directly as the answer to the input question 310. The output may comprise the natural language text of the modified recipe and/or ingredient listing generated when generating the modified existing recipe as discussed above. In some cases this may include the modified acyclic graph as well for the modified recipe.

Figure 4:
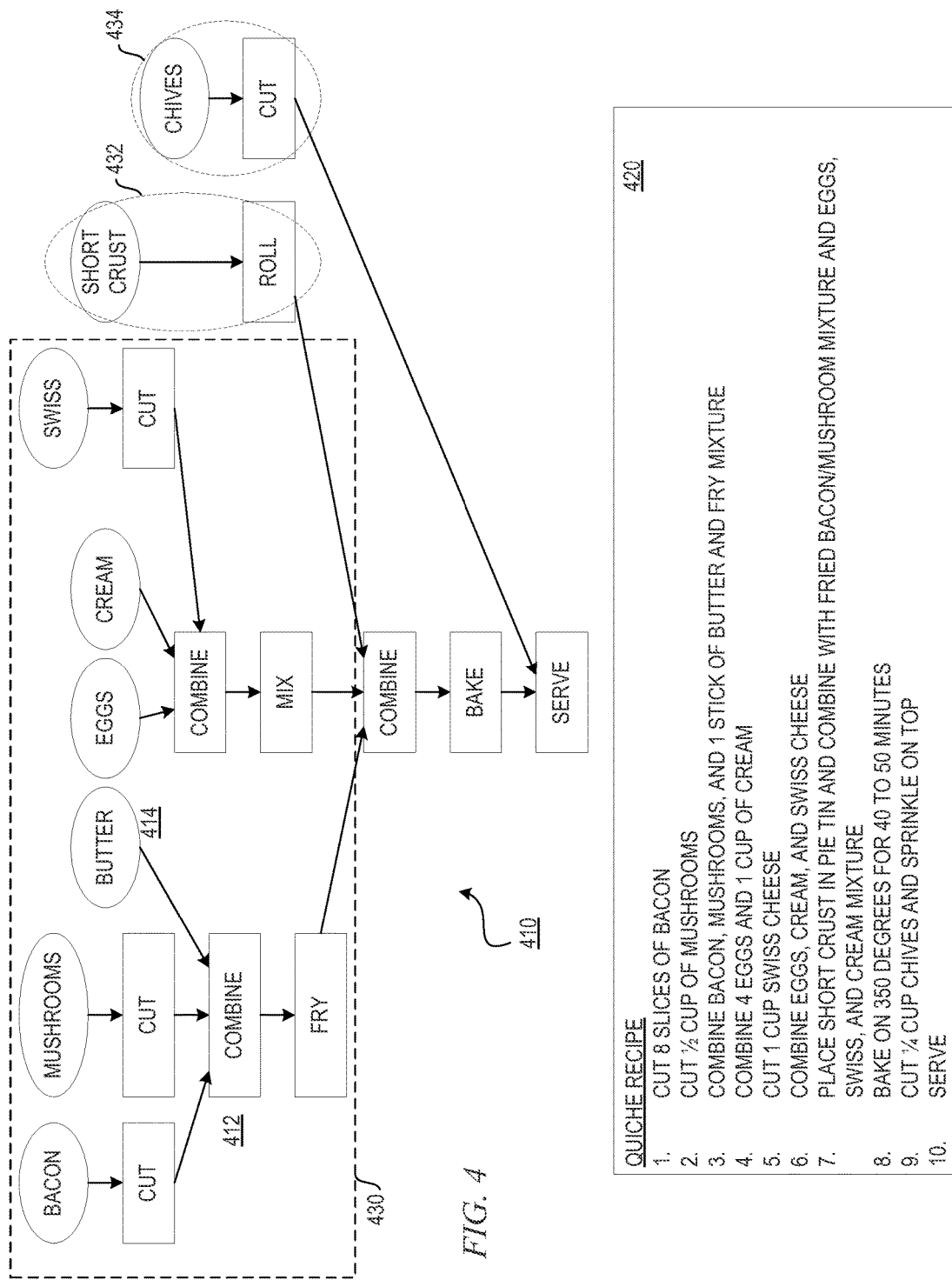
FIG. 4 is an example diagram of an acyclic graph of an example original existing recipe in accordance with one illustrative embodiment.

FIG. 4 is an example diagram of an acyclic graph of an example original existing recipe in accordance with one illustrative embodiment. The acyclic graph 410 is an example of a quiche recipe which is processed using natural language text analysis to identify the various elements (ingredients and actions) represented by the nodes in the acyclic graph and the connections between the nodes as identified by text representing correlations between elements. Actions are represented in the acyclic graph as square boxes 412 while ingredients are represented by ovals 414.

Each of these nodes may have corresponding characteristics or attributes that further define the element, including element types (e.g., meat, vegetable, grain, lean meat, ingredient preparation action, ingredient combination action, etc.), quantities (e.g., 1 cup, 10 ounces, 12 fluid ounces, etc.), as well as other characteristics defining the element such as sizes (e.g., ¼ inch size pieces, small pieces, large chunks, etc.), tools to use (e.g., with a mixer, with a blender, etc.) and the like. These characteristics may be extracted from the natural language text of the recipe that is the basis of the acyclic graph and associated with the corresponding node, such as by using the feature extraction and natural language processing techniques previously discussed above. The natural language text of the original existing recipe 420 is also shown in FIG. 4 for reference. The acyclic graph 410 may be generated when ingesting the recipe from the recipe corpus, for example.

In the depicted example, a number of reusable branches are present in the acyclic graph 410. For example, in the depicted example, the reusable branches 430-434 comprise the branches for cut chives 434, roll short crust 432, and quiche filling 430, since these are the branches that stem from a node, e.g., "combine" or "bake", close to the root node "serve". These reusable branches 430-434 may be used for clustering and to ultimately add similar branches to other recipes in response to a user requesting to add a corresponding recipe element (ingredient/action) in the other recipe in the manner previously described above.

Figure 5:
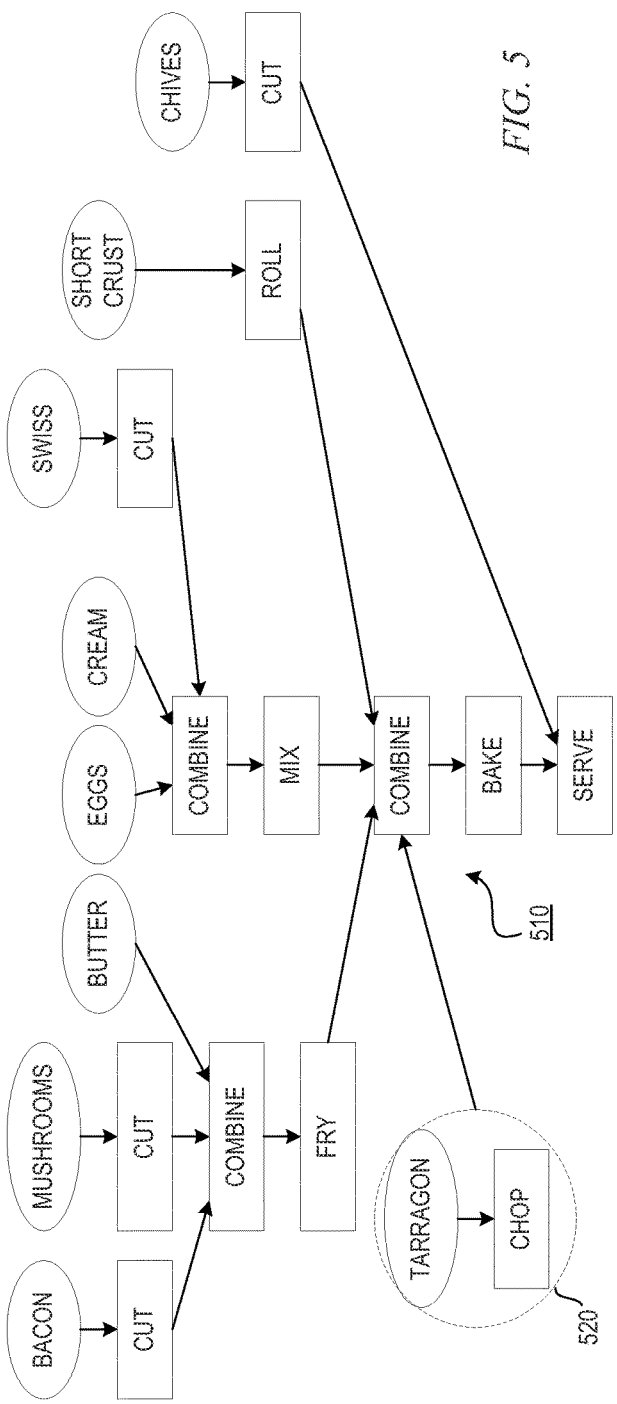
FIG. 5 is an example diagram of an acyclic graph of a modified recipe integrating a selected representative element, and the corresponding natural language text of the recipe generated from the modified acyclic graph, in accordance with one illustrative embodiment.

FIG. 5 is an example diagram of an acyclic graph of a modified recipe integrating a selected representative element, and the corresponding natural language text of the recipe generated from the modified acyclic graph, in accordance with one illustrative embodiment. In the example shown in FIG. 5, it is assumed that a user inputs a question of "How can I add tarragon to my quiche recipe #3?" Through the operations of the illustrative embodiments as described above, it is determined that there is a cluster of reusable branches associated with tarragon which includes other reusable branches including one directed to the inclusion of basil leaves, e.g., another recipe uses basil leaves in a similar egg based dish and has the reusable branch corresponding to "add ¼ ounce of basil leaves to egg mixture". Through compatibility analysis, it is determined based on association rules that the cluster comprising fresh herbs reusable branches is compatible with egg based dishes such as the quiche recipe. The basil reusable branch may be selected as representative of the cluster for modifying the original existing recipe.

Having selected the basil reusable branch, the reusable branch is analyzed to determine where in the existing recipe the reusable branch should be merged. Through analysis of the reusable branch, it is determined that the basil is added to an egg mixture and the existing quiche recipe includes a portion that generates an egg mixture. As a result, it is determined that the basil reusable branch should be added to the acyclic graph at the point where the egg mixtures is created. Basil is then replaced by tarragon, as requested by the user. This results in the modified acyclic graph shown in FIG. 5 which is similar to the acyclic graph in FIG. 4 but with the reusable branch 520 being added to the original existing recipe 410 to generate a modified acyclic graph 510. Through natural language text generation logic, the modified acyclic graph 510 is used as a basis for generating the natural language recipe 530 including the additional text 532 corresponding to the newly introduced reusable branch 520. This natural language recipe 530 may be output to the user as the modified recipe.

Figure 6:
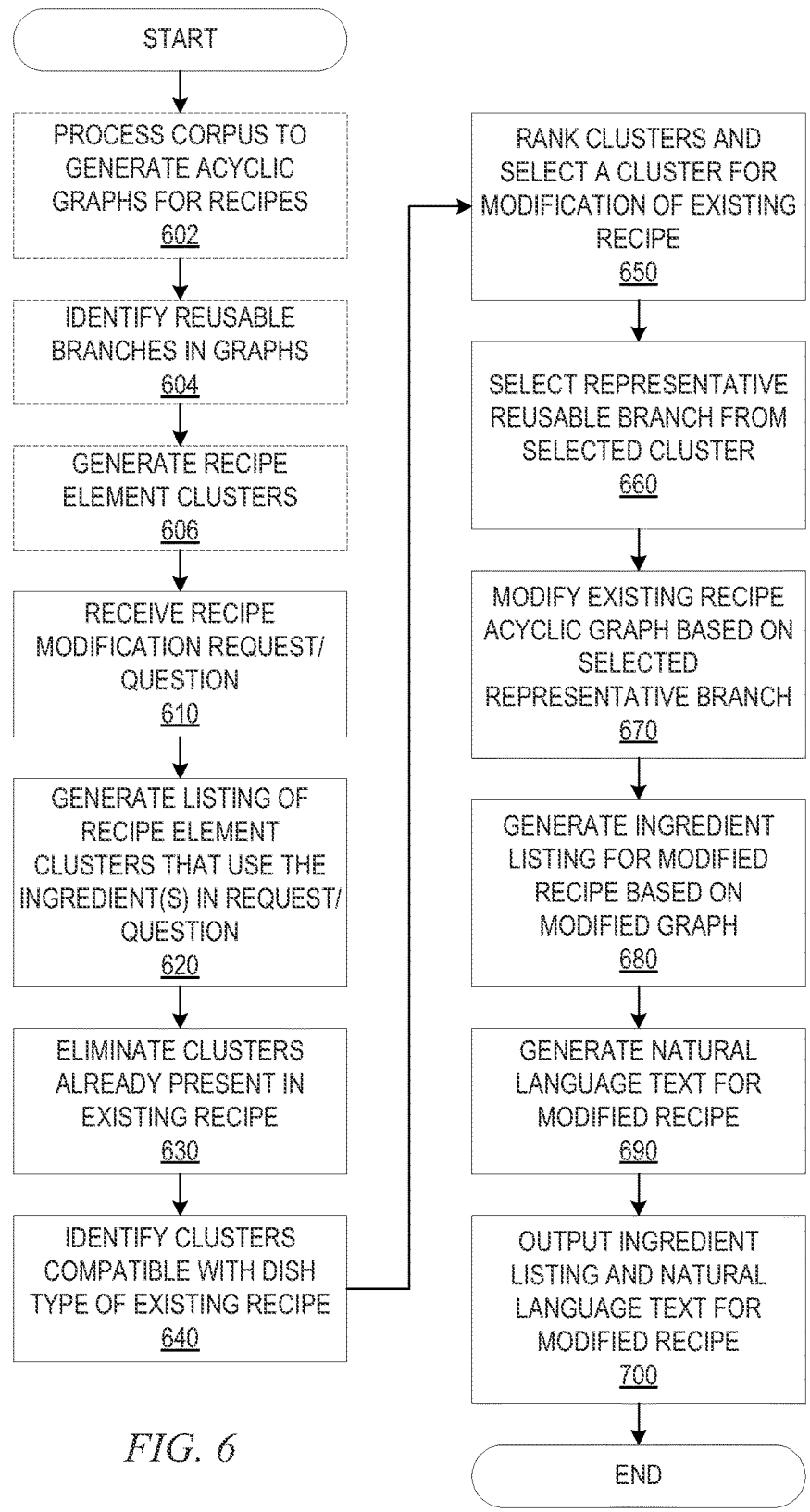
FIG. 6 is a flowchart outlining an example operation for modifying an existing recipe to incorporate a new ingredient in accordance with one illustrative embodiment.

FIG. 6 is a flowchart outlining an example operation for modifying an existing recipe to incorporate a new ingredient in accordance with one illustrative embodiment. For purposes of the operation outlined in FIG. 6, it is assumed that a corpus of recipes has already been processed to generate acyclic graphs, identify reusable branches, and clusters of recipe elements. These operations are shown as dashed box operations 602-606 in FIG. 6.

As shown in FIG. 6, the operation for generating a modified recipe starts by receiving an input request/question requesting a modified recipe, where the request/question identifies the existing recipe to be modified and the ingredient(s) to be added/replaced (step 610). A listing of recipe element clusters that use the given ingredient(s) is generated (step 620). Recipe element clusters that are already present in the original existing recipe are eliminated from the listing (step 630) and recipe element clusters that are compatible with the dish type of the original existing recipe are identified in the listing (step 640) with those that are not being filtered out. From the filtered listing of candidate clusters, a cluster is selected based on association rules and ranking of the clusters (step 650). A representative reusable branch in the selected cluster is selected for use in generating the modification to the original existing recipe (step 660). The selected representative reusable branch is then used to modify the original existing recipe's acyclic graph by including the reusable branch in the original existing recipe's acyclic graph at an appropriate determined location (step 670). The modified acyclic graph is then used to generate ingredient listings for the modified recipe including proportions and natural language instructions for preparation and inclusion into the modified recipe (step 680). Natural language text for the modified acyclic graph is generated using the generated ingredient listing and natural language instructions for the preparation (step 690). The resulting modified recipe including the modified ingredient listing and modified natural language text is then output to the requestor of the modified recipe (step 700). The operation then terminates.

Thus, the illustrative embodiments provide mechanisms for modifying existing recipes based on user specification of ingredient(s) to be added and/or replaced in the existing recipe. The illustrative embodiments perform intelligent cognitive evaluations of existing recipes to determine how and where in the existing recipe to introduce the new ingredient(s) or recommended substitutes for the new ingredients. In addition, modifications to other existing ingredients in the recipe may be identified and used to modify the original existing recipe so that the new ingredient(s) can be accommodated in the modified recipe. Thus, rather than merely determining recipes that include the specified ingredient, as in prior art database lookup based mechanisms, or performing simple straight substitution without any consideration of preparation instructions, proportions, and the like, the illustrative embodiments provide intelligent cognitive recipe modifications.

It should be appreciated that while the above illustrative embodiments are described in the context of an edible recipe for making an edible dish or meal for human consumption, the illustrative embodiments are not limited to such. To the contrary, the mechanisms of the illustrative embodiments may be applied to "recipes" and "ingredients" in other domains where work products are created by assembling various constituents according to specified instructions. That is, the recipes of the illustrative embodiments are a listing of constituent elements with instructions for preparing and/or combining these constituent elements. Examples include material objects and manufactured goods, such as electronic circuits, furniture, pharmaceuticals, toys, sporting equipment, or any other physical work product created by combining other physical components together in accordance with assembly instructions to generate the physical or material work product. Moreover, the illustrative embodiments may be applied to abstract objects, such as complex travel itineraries, financial portfolios, computer programs, or any other abstract work product. Thus, the mechanisms of the illustrative embodiments may be utilized with any domain where a work product is generated using such constituent elements in accordance with such specified instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory comprising instructions which are executed by the processor to cause the processor to implement a recipe modification system, the method comprising:
   receiving, by the recipe modification system, a request, from a requestor computing device, to modify an existing recipe in an electronic corpus of existing recipe data structures, wherein the request is an electronic input to the recipe modification system which identifies an existing recipe corresponding to an existing recipe data structure in the electronic corpus of recipes, and an ingredient to be added to existing ingredients already identified in content of the existing recipe data structure;
   identifying, by the recipe modification system, a cluster of recipe elements, from a plurality of clusters of recipe elements, associated with the ingredient to be added to the existing recipe, wherein the plurality of clusters are identified based on a machine learning process executed on the electronic corpus of existing recipes;
   selecting, by the recipe modification system, a representative member recipe element of the identified cluster;
   modifying, by a cognitive computing engine of the recipe modification system, the existing recipe based on the selected representative member recipe element, wherein modifying the existing recipe comprises performing cognitive computing analysis of the existing recipe and the selected representative member recipe element to determine a timing or location in a sequence of preparation instructions already present in the existing recipe where new preparation instructions, corresponding to the selected representative member recipe element, are added to the sequence of preparation instructions to generate a modified recipe;
   generating, by the cognitive computing engine of the recipe modification system, a natural language text for the modified recipe based on the modification of the existing recipe; and
   outputting, by the recipe modification system, the natural language text for the modified recipe to the requestor computing device.

2. The method of claim 1, wherein the recipe elements comprise reusable branches of acyclic graph data structures corresponding to existing recipes in the electronic corpus of existing recipes.

3. The method of claim 2, wherein the recipe elements comprise reusable branches of acyclic graph data structures corresponding to existing recipes in the electronic corpus of existing recipes which have the same or a similar ingredient to the ingredient to be added to the existing recipe.

4. The method of claim 2, wherein the re sable branches comprise a sub-portion of a recipe, and wherein the reusable branches comprise recipe instructions for performing preparation of a portion of a recipe which are reusable in a plurality of recipes.

5. The method of claim 1, further comprising:
   analyzing the electronic corpus of existing recipes to extract reusable branches of acyclic graph data structures corresponding to the existing recipes; and
   clustering the extracted reusable branches into a plurality of clusters, wherein reusable branches in a same cluster have similar characteristics, and wherein identifying a cluster of recipe elements associated with the ingredient to be added to the existing recipe comprises selecting a cluster from the plurality of clusters that comprises at least one reusable branch having the ingredient to be added to the existing recipe.

6. The method of claim 5, wherein analyzing the electronic corpus of existing recipes comprises, for each existing recipe in the corpus:
   performing natural language processing on the existing recipe to generate an acyclic graph for the existing recipe, wherein nodes represent at least one of ingredients of the existing recipe or actions to be performed with regard to ingredients in the existing recipe; and identifying reusable branches of nodes and connections between nodes in the acyclic graph based on a predetermined relationship with a root node of the acyclic graph.

7. The method of claim 1, wherein identifying the cluster of recipe elements associated with the ingredient to be added to the existing recipe comprises:
identifying, in the plurality of clusters, more than one cluster of recipe elements associated with the ingredient to be added to the existing recipe;
filtering the more than one cluster of recipe elements based on recipe elements in the existing recipe to which the ingredient is to be added; and
selecting the cluster of recipe elements from remaining clusters of recipe elements after filtering.

8. The method of claim 7, wherein filtering the more than one cluster of recipe elements comprises filtering the more than one clusters to remove clusters of recipe elements that match or are incompatible with, the recipe elements in the existing recipe to which the ingredient is to be added.

9. The method of claim 7, wherein filtering the more than one cluster of recipe elements comprises filtering the more than one clusters to remove clusters of recipe elements that are not compatible with a dish type of the existing recipe to which the ingredient is to be added as determined based on one or more predetermined association rules.

10. A computer program product comprising a non-transitory computer readable medium having a computer readable program stored therein, wherein the computer readable program, when executed on a computing device, causes the computing device to implement a recipe modification system that operates to:
receive a request, from a requestor computing device, to modify an existing recipe in an electronic corpus of existing recipes, wherein the request is an electronic input to the recipe modification system which identifies an existing recipe corresponding to an existing recipe data structure in the electronic corpus of recipes, and an ingredient to be added to existing ingredients already identified in content of the existing recipe data structure;
identify a cluster of recipe elements, from a plurality of clusters of recipe elements associated with the ingredient to be added to the existing recipe, wherein the plurality of clusters are identified based on a machine learning process executed on the electronic corpus of existing recipes;
select a representative member recipe element of the identified cluster;
modify the existing recipe based on the selected representative member recipe element, wherein modifying the existing recipe comprises performing cognitive computing analysis of the existing recipe and the selected representative member recipe element to determine a timing or location in a sequence of preparation instructions already present in the existing recipe where new preparation instructions, corresponding to the selected representative member recipe element, are added to the sequence of preparation instructions to generate a modified recipe;
generate a natural language text for the modified recipe based on the modification of the existing recipe; and
output the natural language text for the modified recipe to the requestor computing device.

11. The computer program product of claim 10, wherein the recipe elements comprise reusable branches of acyclic graph data structures corresponding to existing recipes in the electronic corpus of existing recipes.

12. The computer program product of claim 11, wherein the recipe elements comprise reusable branches of acyclic graph data structures corresponding to existing recipes in the electronic corpus of existing recipes which have the same or a similar ingredient to the ingredient to be added to the existing recipe.

13. The computer program product of claim 11, wherein the reusable branches comprise a sub-portion of a recipe, and wherein the reusable branches comprise recipe instructions for performing preparation of a portion of a recipe which are reusable in a plurality of recipes.

14. The computer program product of claim 10, wherein the recipe modification system further operates to:
analyze the electronic corpus of existing recipes to extract reusable branches of acyclic graph data structures corresponding to the existing recipes; and
cluster the extracted reusable branches into a plurality of clusters, wherein reusable branches in a same cluster have similar characteristics, and wherein identifying a cluster of recipe elements associated with the ingredient to be added to the existing recipe comprises selecting a cluster from the plurality of clusters that comprises at least one reusable branch having the ingredient to be added to the existing recipe.

15. The computer program product of claim 14, wherein analyzing the electronic corpus of existing recipes comprises, for each existing recipe in the corpus:
performing natural language processing on the existing recipe to generate an acyclic graph for the existing recipe, wherein nodes represent at least one of ingredients of the existing recipe or actions to be performed with regard to ingredients in the existing recipe; and
identifying reusable branches of nodes and connections between nodes in the acyclic graph based on a predetermined relationship with a root node of the acyclic graph.

16. The computer program product of claim 10, wherein identifying the cluster of recipe elements associated with the ingredient to be added to the existing recipe comprises:
Identifying, in the plurality of clusters, more than one cluster of recipe elements associated with the ingredient to be added to the existing recipe;
filtering the more than one cluster of recipe elements based on recipe elements in the existing recipe to which the ingredient is to be added; and
selecting the cluster of recipe elements from remaining clusters of recipe elements after filtering.

17. The computer program product of claim 16, wherein filtering the more than one cluster of recipe elements comprises filtering the more than one clusters to remove clusters of recipe elements that match or are incompatible with, the recipe elements in the existing recipe to which the ingredient is to be added.

18. The computer program product of claim 16, wherein filtering the more than one cluster of recipe elements comprises filtering the more than one clusters to remove clusters of recipe elements that are not compatible with a dish type of the existing recipe to which the ingredient is to be added as determined based on one or more predetermined association rules.

19. An apparatus comprising:
a processor; and
a memory coupled to the processor, wherein the memory comprises instructions which, when executed by the processor, cause the processor to implement a recipe modification system that operates to:

receive a request, from a requestor computing device, to modify an existing recipe in an electronic corpus of existing recipes, wherein the request is an electronic input to the recipe modification system which identifies an existing recipe corresponding to an existing recipe data structure in the electronic corpus of recipes, and an ingredient to be added to existing ingredients already identified in content of the existing recipe data structure;

identify a cluster of recipe elements, from a plurality of clusters of recipe elements, associated with the ingredient to be added to the existing recipe, wherein the plurality of clusters are identified based on a machine learning process executed on the electronic corpus of existing recipes;

select a representative member recipe element of the identified cluster;

modify the existing recipe based on the selected representative member recipe element, wherein modifying the existing recipe comprises performing cognitive computing analysis of the existing recipe and the selected representative member recipe element to determine a timing or location in a sequence of preparation instructions already present in the existing recipe where new preparation instructions, corresponding to the selected representative member recipe element, are added to the sequence of preparation instructions to generate a modified recipe;

generate a natural language text for the modified recipe based on the modification of the existing recipe; and output the natural language text for the modified recipe to the requestor computing device.

20. The method of claim 2, wherein the reusable branches are portions of the acyclic graph that involve a number of ingredients that is less than a total number of ingredients in the corresponding recipe, and whose nodes, other than a result node in the portion of the acyclic graph, are not referenced by other nodes in the acyclic graph.

* * * * *